United States Patent
O'Gorman et al.

(10) Patent No.: US 10,860,353 B1
(45) Date of Patent: *Dec. 8, 2020

(54) MIGRATING VIRTUAL MACHINES BETWEEN OVERSUBSCRIBED AND UNDERSUBSCRIBED COMPUTE DEVICES

(71) Applicant: Juniper Networks, Inc., Sunnyvale, CA (US)

(72) Inventors: Michael O'Gorman, San Carlos, CA (US); Shesha Sreenivasamurthy, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 15/253,581

(22) Filed: Aug. 31, 2016

Related U.S. Application Data

(63) Continuation of application No. 13/524,333, filed on Jun. 15, 2012, now Pat. No. 9,438,466.

(51) Int. Cl.
*G06F 9/455* (2018.01)
*G06F 9/48* (2006.01)

(52) U.S. Cl.
CPC ........ *G06F 9/45558* (2013.01); *G06F 9/4856* (2013.01); *G06F 2009/4557* (2013.01); *G06F 2009/45575* (2013.01); *G06F 2009/45595* (2013.01)

(58) Field of Classification Search
CPC ............... G06F 9/45558; G06F 9/4856; G06F 2009/4557; G06F 2009/45575; G06F 2009/45595
See application file for complete search history.

(56) References Cited

U.S. PATENT DOCUMENTS

| 8,352,608 B1 * | 1/2013 | Keagy | G06F 8/63 709/226 |
| 9,047,136 B2 * | 6/2015 | Thanga | G06F 9/5077 |

(Continued)

OTHER PUBLICATIONS

Daniel, Shibu et al. "Preidction-Based Virtual Instance Migration for Balanced Workload in the Cloud Datacenters", 2011, 5 pages.

(Continued)

*Primary Examiner* — Wissam Rashid
(74) *Attorney, Agent, or Firm* — Cooley LLP

(57) ABSTRACT

In some embodiments, a non-transitory processor-readable medium includes code to cause a processor to receive, at a management device, an instantiation request for a first virtual machine. The code includes code to cause the processor to identify a first compute device at a first time such that the first compute device is undersubscribed at the first time. The code includes code to cause the processor to send an instruction to instantiate the first virtual machine at the compute device, and receive a signal indicating that a boot process associated with the first virtual machine is complete and that the virtual machine is instantiated at the first compute device. The code includes code to cause the processor to send at a second time, a signal to migrate the first virtual machine from the first compute device to a second compute device in response to the boot process being complete.

18 Claims, 4 Drawing Sheets

(56) References Cited

U.S. PATENT DOCUMENTS

| | | | |
|---|---|---|---|
| 2005/0246453 A1* | 11/2005 | Erlingsson | G06F 9/4555 |
| | | | 710/1 |
| 2007/0171921 A1* | 7/2007 | Wookey | G06F 3/1415 |
| | | | 370/401 |
| 2008/0059556 A1 | 3/2008 | Greenspan et al. | |
| 2009/0031307 A1* | 1/2009 | Chodroff | G06F 9/5077 |
| | | | 718/100 |
| 2009/0070760 A1* | 3/2009 | Khatri | G06F 9/4856 |
| | | | 718/1 |
| 2009/0300173 A1 | 12/2009 | Bakman et al. | |
| 2010/0027420 A1 | 2/2010 | Smith | |
| 2010/0125845 A1 | 5/2010 | Sugumar et al. | |
| 2011/0173637 A1 | 7/2011 | Brandwine et al. | |
| 2013/0054813 A1 | 2/2013 | Bercovici et al. | |
| 2013/0086235 A1 | 4/2013 | Ferris | |
| 2013/0111474 A1 | 5/2013 | Agarwal et al. | |

OTHER PUBLICATIONS

Polze, Andreas et al. "Timely Virtual Machine Migration for Pro-Active Fault Tolerance", Object/Component/Service-Oriented Real-Time Distributed Computing Workshops (ISORCW), 2011 14th IEEE International Symposium on. IEEE, 2011, 10 pages.

* cited by examiner

US 10,860,353 B1

MIGRATING VIRTUAL MACHINES BETWEEN OVERSUBSCRIBED AND UNDERSUBSCRIBED COMPUTE DEVICES

CROSS REFERENCE TO RELATED APPLICATIONS

This application is a continuation of U.S. patent application Ser. No. 13/524,333, filed on Jun. 15, 2012, entitled "Migrating Virtual Machines Between Oversubscribed and Undersubscribed Compute Devices" (now U.S. Pat. No. 9,438,466), the contents of which are incorporated herein by reference.

BACKGROUND

Some embodiments described herein relate generally to methods and apparatus for migrating virtual machines between oversubscribed compute devices and undersubscribed compute devices in an enterprise. Such methods and apparatus can include, for example, the instantiation of new virtual machines and the migration of virtual machines that already exist, based on, for example, a prediction of resource-intensive events prior to their manifestation.

One of the advantages of server (or host machine) virtualization is the ability to better use the physical resources in an enterprise network system such as, for example, the central processing unit (CPU), random access memory (RAM), hard disk, network bandwidth, and/or the like. For example, given a physical server (or host machine) with n CPU cores, where n can be any number, one can effectively run m guest operating systems, where m is greater than n (m>n), inside isolated containers called virtual machines on that server (or host machine). One known method to implement virtual machines is through an undersubscription policy with respect to the CPU and/or other physical resources (also referred to as a "compute device in an undersubscribed configuration" or an "undersubscribed compute device"): the virtual machines are provisioned with a fewer or equal number of CPU's (and/or other physical resources) than physical CPUs (m≤n). Under such a policy, no single virtual machine can adversely affect the performance of other virtual machines running on the same server (or host machine). Given that typical virtual machines rarely consume 100% of their provisioned physical resources, however, all the time an oversubscription policy can be implemented (also referred to as a "compute device in an oversubscribed configuration" or an "oversubscribed compute device"): the virtual machines are provisioned with more CPU's (and/or other physical resources) than physical CPUs. Under such a policy, CPU utilization of the physical hardware in the enterprise can be much higher.

Many cases exist where an oversubscription policy to implement virtual machines are desirable. A virtual machine's life cycle, however, can include instances where an increase in the CPU activity with a guest operating system can adversely affect the performance of other virtual machines running on the same server (or host device). This can lead to unpredictable performance of the virtual machines running on the server (or host device).

Accordingly, a need exists for methods and apparatus for migrating virtual machines between oversubscribed compute devices and undersubscribed compute devices in an enterprise that can include the instantiation (or booting) of new virtual machines, and migration of virtual machines that already exist based on prediction of resource-intensive events prior to their manifestation.

SUMMARY

In some embodiments, a non-transitory processor-readable medium includes code to cause a processor to receive, at a management device, an instantiation request for a first virtual machine. The code includes code to cause the processor to identify a first compute device at a first time such that the first compute device is undersubscribed at the first time. The code includes code to cause the processor to send an instruction to instantiate the first virtual machine at the compute device, and receive a signal indicating that a boot process associated with the first virtual machine is complete and that the virtual machine is instantiated at the first compute device. The code includes code to cause the processor to send at a second time, a signal to migrate the first virtual machine from the first compute device to a second compute device in response to the boot process being complete.

DETAILED DESCRIPTION

Figure 1:
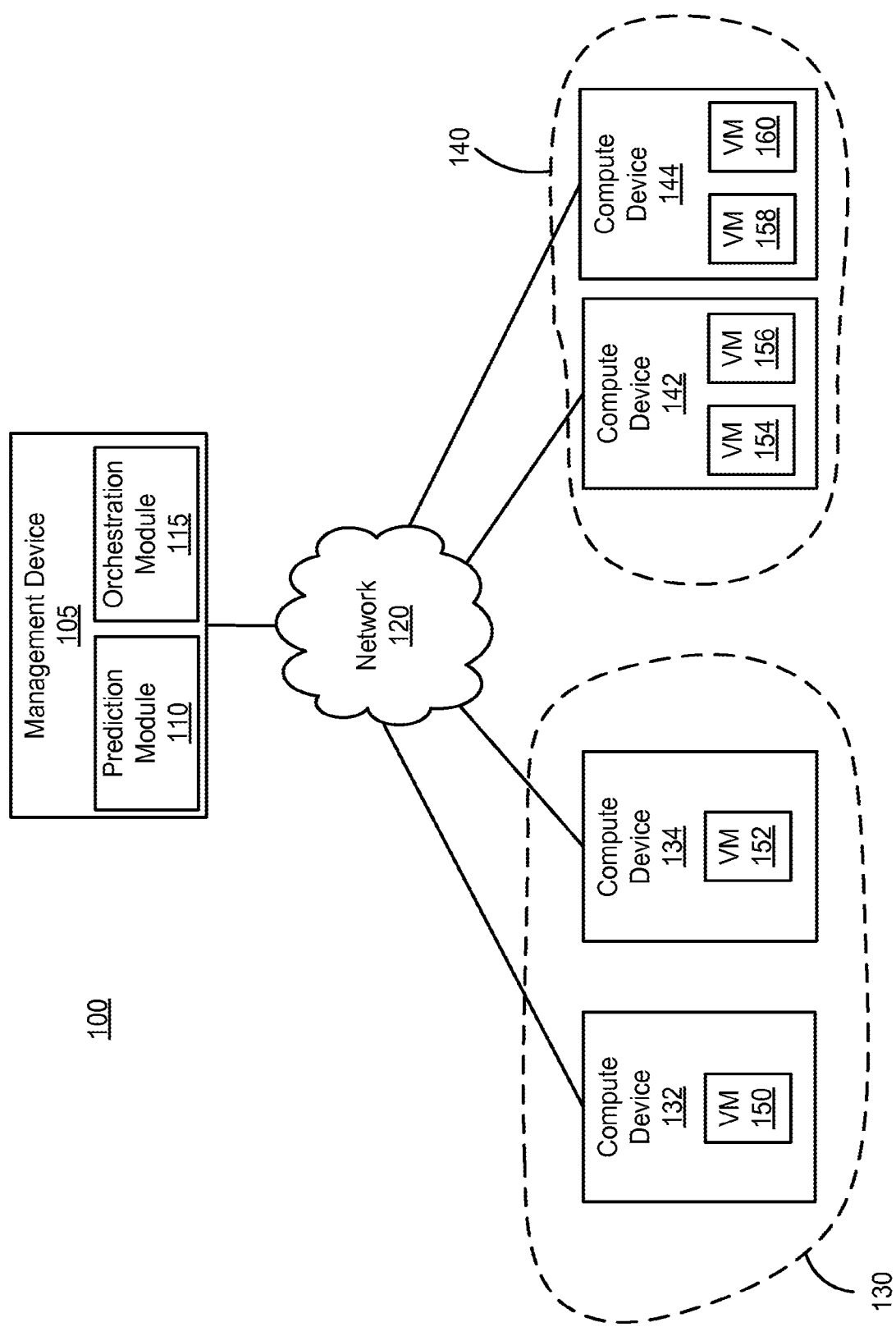
FIG. 1 is a schematic illustration of a system for migrating virtual devices between undersubscribed and oversubscribed compute devices, according to an embodiment.

In some embodiments, a non-transitory processor-readable medium includes code to cause a processor to receive, at a management device, an instantiation request for a first virtual machine. The code includes code to cause the processor, in response to the instantiation request, to identify a first compute device at a first time such that the first compute device is undersubscribed at the first time. The code includes code to cause the processor to send after the first time and before a second time, an instruction to instantiate the first virtual machine at the compute device. The code includes code to cause the processor to receive a signal indicating that a boot process associated with the first virtual machine is complete and that the virtual machine is instantiated at the first compute device, and send, at a second time, a signal to migrate the first virtual machine from the first compute device to a second compute device in response to the boot process being complete, the second compute device executing a second virtual machine at the second time. In some embodiments, the second compute device can also execute a third virtual machine at the second time. The code includes code to cause the processor to send at a third time after the second time and in response to a prediction of a resource-intensive event, a signal to migrate the first virtual machine from the second compute device to a third compute device, the third compute device being undersubscribed at the third time. In some instances, the third compute device can be different from the first compute device, and in other instances, the third compute device can be the same as the first compute device.

In some embodiments, the management device can be, for example, a web server, an application server, a proxy server, or a personal computing device such as a desktop computer, a laptop computer, and/or the like. The management device can include a prediction module and an orchestration module. In some embodiments, the orchestration module can be a hardware and/or software module stored in the memory and executed in the processor of the management device, and can be configured to be operatively coupled to a compute device that implements an undersubscribed policy (also referred to as a "compute device in an undersubscribed configuration" or an "undersubscribed compute device") and a compute device that implements an oversubscribed policy (also referred to as a "compute device in an oversubscribed configuration" or an "oversubscribed compute device"). The orchestration module can be configured to receive an instantiation request for a virtual machine, and can be configured to send an instruction to instantiate the virtual machine at the undersubscribed compute device in response to the instantiation request. The orchestration module can be configured to receive a signal indicating that a boot process associated with the virtual machine is complete, and the first virtual machine is instantiated at the undersubscribed compute device. The orchestration module can be configured to send a signal to migrate the virtual machine from the undersubscribed compute device to the oversubscribed compute device in response to the boot process being complete.

In some embodiments, an undersubscribed compute device can be configured to receive, from an orchestration module, an instantiation request associated with booting or rebooting a virtual machine. The undersubscribed compute device can be configured to execute a boot process associated with the virtual machine in response to the instantiation request, and send an indication to the orchestration module that the boot process is complete and that the virtual machine is instantiated at the undersubscribed compute device. In response to the indication, the undersubscribed compute device can be configured to receive, from the orchestration module a signal to migrate the virtual machine from the undersubscribed compute device to an oversubscribed compute device.

The undersubscribed compute devices and the oversubscribed compute devices can be located in collocation centers, different kinds of data centers such as, for example, Enterprise Data Centers, Hosting or Infrastructure as a Service (IaaS) Data Centers, Portal or Web 2.0 Data Centers, mobile data centers such as, for example, Sun Modular Datacenters, International Business Machine (IBM) Portable Modular Data Centers, Google Modular Data Centers, and/or the like.

As used in this specification, the singular forms "a," "an" and "the" include plural referents unless the context clearly dictates otherwise. Thus, for example, the term "a compute device" is intended to mean a single compute device or a combination of compute devices.

FIG. 1 is a schematic illustration of a system for migrating virtual devices between undersubscribed and oversubscribed compute devices, according to an embodiment. The migration system 100 includes a management device 105, a network 120, a group of undersubscribed compute devices 130 and a group of oversubscribed compute devices 140. The network 120 can be any type of network (e.g., a local area network (LAN), a wide area network (WAN), a virtual network, and a telecommunications network) implemented as a wired network and/or wireless network. As described in further detail herein, in some embodiments, for example, the management device 105 can be connected to the undersubscribed compute devices 132 and 134 and the oversubscribed compute devices 142 and 144 via an intranet, an Internet Service Provider (ISP) and the Internet, a cellular network (e.g., network 120), and/or the like.

The management device 105 can be, for example, a web server, an application server, a proxy server, a telnet server, a file transfer protocol (FTP) server, or a personal computing device such as a desktop computer, a laptop computer, and/or the like. The management device 105 can include a prediction module 110 and an orchestration module 115. The orchestration module 115 can be a hardware module and/or software module (stored in memory and/or executed in a processor of the management device 105) that can be operatively coupled to a group of undersubscribed compute devices 130 and a group of oversubscribed compute device 140, via the network 120. The orchestration module 115 can receive an instantiation request associated with booting or rebooting a virtual machine from, for example, a communication device of or an interface for (not shown) a network administrator, a network analyst, a network engineer, and/or the like. In response to the instantiation request, the orchestration module 115 can send a signal associated with instructions to instantiate a virtual machine 150 or 152 in the group of undersubscribed compute devices 130. The orchestration module 115 can receive a signal indicating that a boot process associated with the virtual machine 150 or 152 is complete, and the first virtual machine 150 or 152 is instantiated at the undersubscribed compute device 132 or 134 within the group of undersubscribed compute devices 130. The orchestration module 115 can send a signal to migrate the virtual machine 150 or 152 from an undersubscribed compute device 132 or 134 to an oversubscribed compute device 142 or 144 in response to the boot process being complete.

The prediction module 110 can be a hardware module and/or software module stored in memory and/or executed in a processor of the management device 105 that can be operatively coupled to the group of undersubscribed compute devices 130 and the group of oversubscribed compute device 140, via the network 120. The prediction module 110 can receive a signal associated with a status of the virtual machine (154, 156, 158 or 160) at the group of oversubscribed compute devices 140, and predict based on the status, a resource-intensive event that can occur at the virtual machines 154-160. The prediction module 110 can send to the orchestration module 115 a signal that contains information associated with the results of the prediction by the prediction module 110. This can instigate or trigger the orchestration module 115 to send a signal to migrate the virtual machine (154, 156, 158 or 160) from the oversubscribed compute device 142 or 144 to an undersubscribed compute device 132 or 134 prior to the resource-intensive event occurring.

A physical resource can be any computer and/or internet network related device, resource or process such as, for example, a central processing unit (CPU), a random access memory (RAM), a hard disk, network bandwidth, etc. that individual virtual machines can consume. For example, in some instances, an oversubscribed compute device can include 20 GB of RAM that is running (or hosting) ten individual virtual machines, each of which can be provisioned with 4 GB of RAM. In another example, on an undersubscribed compute device, the network administrator (or network analyst, or network engineer) will be unable to provision greater than 100% of the total available memory to running virtual machines. This restriction applies because a certain portion of the available memory can be required for running other applications on the undersubscribed compute device such as, for example, the operating system, the hypervisor, the orchestration module, and/or the like, as described in greater detail herein. A similar analogy can be extended for hard disk consumption. Regarding network bandwidth, in some instances, an oversubscribed (or undersubscribed) compute device can have a 10 GB network interface through which traffic from multiple virtual machines is routed. In such instances, a layer of software in the oversubscribed (or undersubscribed) compute device can be implemented to throttle and/or limit the bandwidth consumption of individual virtual machines based on specific pre-determined policy decisions. Thus, in such embodiments, each virtual machine can be configured to use less bandwidth than a bandwidth threshold.

The group of undersubscribed compute devices 130 include compute devices that each can run one or more virtual machines, whereby the number of virtual machines collectively provisioned is less than or equal to the number of physical CPUs. With such undersubscribed compute devices, the maximum processing needs of all the virtual machines running on a compute device 132 and/or 134 with respect to the CPU, RAM, hard disk, network bandwidth, etc, do not exceed the physical processing capabilities of the compute device 132 and/or 134. In addition, no single virtual machine can affect the performance of other virtual machines running on the same host compute device 132 and/or 134. In the embodiment shown in FIG. 1, the group of undersubscribed computing devices 130 can include compute devices 132 and 134, with each running a virtual machine 150 and 152, respectively. In some instances, the compute devices 132 and/or 134 can be a server such as, for example, a web server, an application server, a proxy server, a telnet server, a file transfer protocol (FTP) server, a mail server, a list server, a collaboration server and/or the like. In other instances, the compute devices 132 and/or 134 can be a personal computing device such as a desktop computer, a laptop computer, a personal digital assistant (PDA), a standard mobile telephone, a tablet personal computer (PC), and/or so forth. The virtual machines 150 or 152 each can be a tightly isolated software environment within the compute devices 132 or 134 and can run its own operating system and applications similar to a physical compute device 132 or 134. The virtual machines 150 or 152 each can behave like a physical compute device 132 or 134, and can contain its own virtual (i.e., software-based) CPU, RAM, hard disk and network interface card (NIC). In some instances, the virtual machines 150 or 152 each can be a software implementation of a hardware component, module or system (or portions of it) and can execute an operating system such as, for example, a Windows operating system, Linux, a Mac Operating System (OS), and/or the like. In other instances, the virtual machines 150 or 152 each can be software implementations of a program, and/or an application (e.g., a cloud service application), and/or a script similar to a real machine.

The group of oversubscribed compute devices 140 can include compute devices 142 and 144 that each can run one or more virtual machines 154-160, whereby the number of virtual machines collectively provisioned is more than the number of physical CPUs. With such oversubscribed compute devices, the theoretical maximum processing needs of all the virtual machines running on a compute device 142 and/or 144 with respect to CPU, RAM, hard disk, network bandwidth, etc, exceeds the physical processing capabilities of the compute device 142 and/or 144. In addition, much higher CPU utilization of the available physical hardware is possible because most of the virtual machines 154-160 generally do not consume 100% of their provisioned physical resources all the time. In the embodiment shown in FIG. 1, the group of oversubscribed computing devices 140 can include compute devices 142 and 144, which are running virtual machines 154, 156 and 158, 160 respectively. Similar to the group of undersubscribed compute devices 130, in some instances, the compute devices 142 and/or 144 can be a server such as, for example, a web server, an application server, a proxy server, a telnet server, a file transfer protocol (FTP) server, a mail server, a list server, a collaboration server and/or the like. In other instances, the compute devices 142 and/or 144 can be a personal computing device such as a desktop computer, a laptop computer, a personal digital assistant (PDA), a standard mobile telephone, a tablet personal computer (PC), and/or so forth. As with the virtual machines running on undersubscribed compute devices, the virtual machines 154-160 can be a software implementation of a hardware component, module or system (or portions of it) that can execute an operating system, and/or a program, and/or an application (e.g., a cloud service application), and/or a script similar to a real machine. In most cases, the virtual machines 154-160 can allow physical compute devices 142 and/or 144 to run one or more operating systems or applications concurrently on the same compute device, thus improving availability and performance of hardware for most enterprise applications.

The migration system 100 offers the enterprise network system several advantages. First, the migration system 100 allows a new virtual machine to be booted or instantiated in an undersubscribed compute device (instead of an oversubscribed compute device) until the new virtual machine reaches steady state. Thus, the physical-resource-intensive (or compute intensive) booting process can occur in an unsubscribed compute device or "birthing station" that has a low work load. As such, potential unpredictable performances of the virtual machine during booting or instantiation can be avoided and adverse effects on the performance of any other virtual machines running on an oversubscribed compute device can also be prevented. Once booted, the virtual machine can be migrated to an oversubscribed compute device without significantly affecting the performance of any other virtual machines already running on the oversubscribed compute device. Additionally, during other physical resource-intensive events such as, for example, upgrading a virtual machine, or making a backup of a virtual machine at a specified time, the virtual machine can be migrated from an oversubscribed compute device to an undersubscribed compute device. Second, migration of a virtual machine from an oversubscribed compute device to an undersubscribed compute device based on prediction of a resource-intense event can allow the resource-intensive event to execute more smoothly on the virtual machine, without significantly adversely affecting the performance of the other virtual machines that are being hosted by the oversubscribed compute device. Such prediction and migration can avoid or reduce the enterprise network system reacting to adverse events after they have occurred, and allows the enterprise network system instead to prepare for potential adverse situations in advance by having the virtual machines running on an oversubscribed compute devices to have predictable performance. Such predictable performance can allow a network administrator to increase or maximize computing resources of an enterprise without significantly compromising performance.

Figure 2:
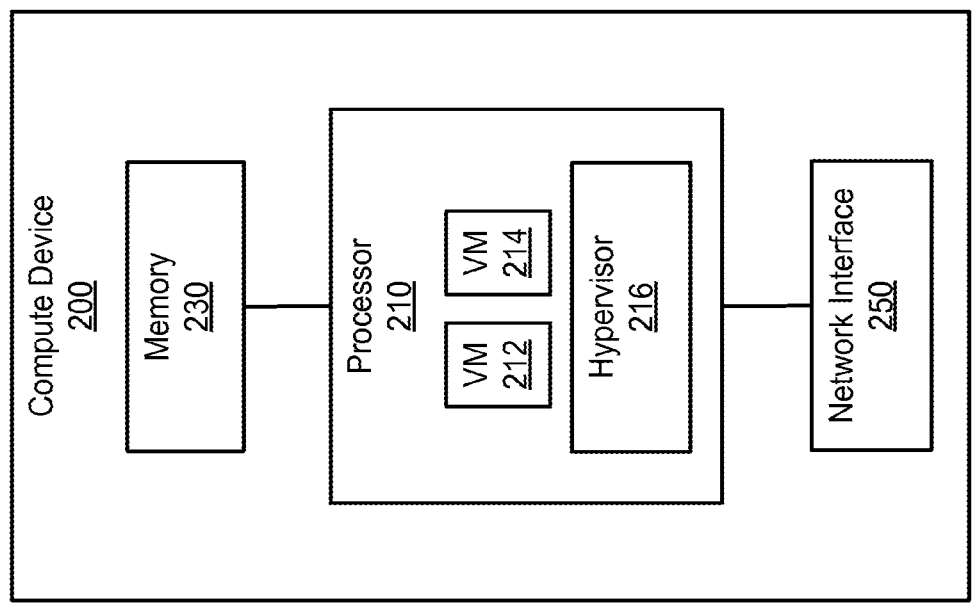
FIG. 2 is a system block diagram of a compute device, according to an embodiment.

FIG. 2 is a system block diagram of a compute device 200 similar to the compute devices 132, 132, 142 or 144 of FIG. 1, according to an embodiment. The compute device 200 includes a processor 210, a memory 230, and a network interface 250. The processor 210 is operatively coupled to the memory 230 and the network interface 250. The processor 210 can be, for example, a general purpose processor, a Field Programmable Gate Array (FPGA), an Application Specific Integrated Circuit (ASIC), a Digital Signal Processor (DSP), and/or the like. The processor 210 can be configured to run and/or execute processes and/or other modules, processes and/or functions associated with the compute device 200 and/or virtual machines 212 or 214 and/or the migration system 100. The processor 210 includes a first virtual machine 212, a second virtual machine 214, and a hypervisor 216. While shown in FIG. 2 as having two virtual machines 212 and 214, in other embodiments the communication device 200 can include any number of virtual machines. As discussed above, the virtual machine 212 and/or 214 can be a software implementation of a hardware component, module or system (or portions of it) that can execute an operating system, and/or a program, and/or an application (e.g., a cloud service application), and/or a script similar to a real machine.

In some instances when the compute device 200 is operating as an undersubscribed compute device, a signal to instantiate the virtual machine 212 or 214 can be sent by the orchestration module 115 of the management device 105 at a first time to the compute device 200, providing the compute device 200 is undersubscribed at the first time. Once the boot process associated with the virtual machine 212 or 214 is complete and the virtual machine 212 or 214 is instantiated at the compute device 200, a second signal can be received by the compute device 200 (from the orchestration module 115) to migrate the instantiated virtual machine 212 or 214 from the compute device 200 to a second oversubscribed compute device which is separate from the compute device 200).

In other instances when the compute device 200 is operating as an oversubscribed compute device, the prediction module 110 predicts the occurrence of a resource-intensive event on the virtual machine 212 and/or 214. The compute device 200 can receive a signal (from the orchestration module 115) to migrate the virtual machine 212 or 214 from the compute device 200 to an undersubscribed compute device.

The hypervisor 216 is a hardware component or module that performs a virtualization technique to allow multiple virtual machines 212 and 214 (that can run individual operating systems) to run concurrently on a host compute device 200. The hypervisor 216 can present to the virtual machines 212 and/or 214 a virtual operating platform and can manage the execution of the virtual machines 212 and/or 214. In some instances the hypervisor 216 can be a Type 1 (or native, bare metal) hypervisor such as, for example, a Citrix XenServer, a VMware ESX/ESXi, or a Microsoft Hyper-V hypervisor. In such instances the hypervisor 216 can run directly on the hardware of the compute device 200 to control the hardware and to manage guest operating systems for virtual machines 212 and/or 214, which will run on a level above the hypervisor 216. In other instances the hypervisor 216 can be a Type 2 (or hosted) hypervisor such as, for example, a Kernel-based Virtual Machine (KVM), or a Berkeley Software Distribution Hypervisor (BHyVe), or an Oracle VM VirtualBox, and/or the like. In such instances the hypervisor 216 can run within a conventional operating system environment. With the hypervisor layer as a distinct second software level, guest operating systems for virtual machines 212 and/or 214 can run at the third level above the hardware.

The memory 230 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 230 can store instructions to cause the processor 210 to execute modules, processes and/or functions associated with the virtual machines 212 and/or 214, the hypervisor 216 and/or the migration system 100.

The network interface 250 can connect the compute device 200 to a network such as the computer network 120 in FIG. 1, and can be for example, a Local Area Network (LAN) Ethernet interface, a Wireless Fidelity (WiFi) interface, a cellular interface, and/or the like. When an Ethernet network interface, the network interface 250 can connect the compute device 200 to, for example, a hardwired computer network 120. When a WiFi network interface, the network interface 250 can connect the compute device 200 to, for example, a wireless computer network 120. When a cellular network interface, the network interface 250 can connect the compute device 200 to, for example, a cellular computer network 120. In some instances, when the compute device 200 is an undersubscribed compute device, the network interface 250 can receive a signal from the orchestration module 115 associated with instructions to instantiate a virtual machine 212 or 214 at the compute device 200, and send the signal to the processor 210 via a system bus (not shown). In such instances, the network interface 250 can also send a signal from the processor 210 to the orchestration module 115 via the network 120 indicating when the boot process associated with the virtual machine 212 or 214 is complete, and that the virtual machine 212 or 214 is instantiated at the compute device 200. The network interface 250 can also receive a signal from the orchestration module 115 associated with information to migrate the virtual machine 212 or 214 from the compute device 200 to an oversubscribed compute device in response to the boot process being complete.

In some other instances, when the compute device 200 is an oversubscribed compute device, the network interface 250 can send a status signal from the processor 210 to the prediction module 110 via the network 120 that is associated with the status of the virtual machine 212 and/or 214. This status signal can be, for example, predictive of the onset of a resource-intensive event (e.g., upgrading a virtual machine 212 or 214, or making a backup of a virtual machine 212 or 214 at a specified time, and/or the like) to be executed in the virtual machine 212 and/or 214. The network interface 250 can receive a signal from the orchestration module 115 prior to the onset of the resource-intensive event that is associated with migrating the virtual machine 212 or 214 from the compute device 200 to an undersubscribed compute device, and can send the signal to the processor 210 via the system bus.

Figure 3:
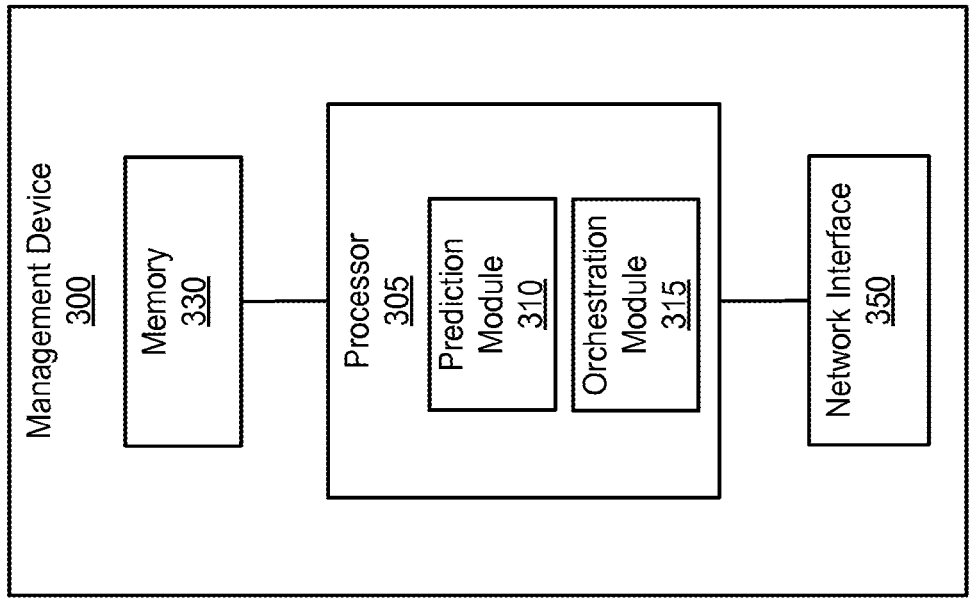
FIG. 3 is a system block diagram of a management device, according to an embodiment.

FIG. 3 is a system block diagram of a management device 300 similar to the management device 105 of FIG. 1, according to an embodiment. In some embodiments, the management device 300 can be a server machine such as, for example, a web server, an application server, a proxy server, a telnet server, a file transfer protocol (FTP) server, and/or the like. In other embodiments, the management device 300 can also be a personal computing device such as a desktop computer, a laptop computer, and/or the like. The management device 300 includes a processor 305, a memory 330, and a network interface 350. The memory 330 can be, for example, a random access memory (RAM), a memory buffer, a hard drive, a database, an erasable programmable read-only memory (EPROM), an electrically erasable read-only memory (EEPROM), a read-only memory (ROM) and/or so forth. The memory 330 can store instructions to cause the processor 305 to execute modules, processes and/or functions associated with the prediction module 310 and/or the orchestration module 315 and/or the virtual machine migration system 100.

The processor 305 is operatively coupled to the memory 330 and the network interface 350 and includes a prediction module 310 and an orchestration module 315. The processor 305 can be, for example, a general purpose processor, a Field Programmable Gate Array (FPGA), an Application Specific Integrated Circuit (ASIC), a Digital Signal Processor (DSP), and/or the like. The processor 305 can be configured to run and/or execute application processes and/or other modules, processes and/or functions associated with the prediction module 310 and/or orchestration module 315 and/or the migration system 100. Referring to FIGS. 1 and 3, the prediction module 310 can be a hardware module and/or software module (stored in memory 330 and/or executed in a processor 305 of the management device 300) that can be operatively coupled to the group of undersubscribed compute devices 130 and the group of oversubscribed compute device 140, via the network 120 (see FIG. 1). The prediction module 310 can be configured to continuously, periodically or repeatedly monitor the "work load" status of the virtual machines (154-160) in the group of oversubscribed compute devices 140. The prediction module can receive a signal associated with a status of the virtual machines (154 and/or 156 and/or 158 and/or 160) at the group of oversubscribed compute devices 140, and can predict based on the status signal and statistical predictive algorithms (e.g., regression models, time series models, survival or duration analysis, machine learning techniques, classification and regression trees, etc.) the high probability of occurrence of a resource-intensive event on a virtual machine prior to its manifestation (e.g., upgrading a virtual machine, or making a backup of a virtual machine at a specified time, and/or the like). In such instances, the prediction module 310 can be configured to send a signal to the orchestration module 315 via a processor bus (not shown). This signal can allow the orchestration module 115 to commence the process of migrating the appropriate virtual machine (154-160) from the oversubscribed compute device 142 or 144 to an undersubscribed compute device 132 or 134, prior to the resource-intensive event occurring.

Referring to FIGS. 1 and 3, the orchestration module 315 can be a hardware module and/or software module (stored in memory 330 and/or executed in the processor 305 of the management device 300) that can be operatively coupled to a group of undersubscribed compute devices 130 and a group of oversubscribed compute device 140, via the network 120. The orchestration module 315 can receive a signal at a first time requesting to instantiate a virtual machine from, for example, a communication device of or an interface for a network administrator, a network analyst, a network engineer, and/or the like. In response to the instantiation request, the orchestration module 315 can send after the first time and before a second time a signal associated with instructions to instantiate the virtual machine 150 or 152 in an undersubscribed compute device 132 or 134, via the network 120. The orchestration module 315 can receive a signal (via the network 120) indicating that a boot process associated with the virtual machine 150 or 152 is complete, and the first virtual machine 150 or 152 is instantiated at an undersubscribed compute device 132 or 134. In response to the boot process being complete, the orchestration module 315 can be configured to send a signal (via the network 120) at a second time to the undersubscribed compute device 132 or 134 that is associated with instructions to migrate the virtual machine 150 or 152 from the undersubscribed compute device 132 or 134 to an oversubscribed compute device 142 or 144. Additionally, in some instances, in response to receiving a signal from the prediction module 310 associated with predicting the occurrence of a resource-intensive event on a virtual machine (154, 156, 158 or 160) on an oversubscribed compute device 142 or 144, the orchestration module 315 can send at a third time after the second time to the oversubscribed compute device 142 or 144 a signal (via the network 120) that is associated with migrating the related virtual machine (154, 156, 158 or 160) from the oversubscribed compute device 142 or 144 to an undersubscribed compute device 132 or 134 prior to the occurrence of the resource-intensive event.

The network interface 350 can connect the management device 300 to the computer network 120 and can be for example, a Local Area Network (LAN) Ethernet interface, a Wireless Fidelity (WiFi) interface, a cellular interface, and/or the like. When an Ethernet network interface, the network interface 350 can connect the management device 300 to, for example, a hardwired computer network 120. When a WiFi network interface, the network interface 350 can connect the management device 300 to, for example, a wireless computer network 120. When a cellular network interface, the network interface 350 can connect the management device 200 to, for example, a cellular computer network 120. In some instances, the network interface 350 can send from the orchestration module 315 to an undersubscribed compute device 132 or 134 (via the network 120) a signal that is associated with instructions to instantiate a virtual machine 150 or 152 at the undersubscribed compute device 132 or 134. In other instances, the network interface 350 can receive from an undersubscribed compute device 132 or 134 (via the network 120) a signal that is associated with indicating when the boot process associated with the virtual machine 150 or 152 is complete and the virtual machine 150 or 152 is instantiated at the undersubscribed compute device 132 or 134. In such instances, the network interface 350 can send the signal to the processor 305 via the system bus.

In yet other instances, the network interface 350 can receive at a first time from an oversubscribed compute device 142 or 144 a signal (via the network 120) that is associated with the status of the virtual machines (154-160) running on the oversubscribed compute devices 142 and/or 144. In such instances, the network interface 350 can send the signal at a second time to the prediction module 310 via the system bus. Depending on the contents of or information represented by the status signal and/or the results of the prediction analysis performed by the prediction module 310, the network interface 350 can send from the orchestration module 315 to the related oversubscribed compute device 142 or 144 (via the network 120) at a third time a signal that is associated with instructions on migrating the virtual machine (154, 156, 158 or 160) predicted to have a resource-intensive event from the oversubscribed compute device 142 or 144 to an undersubscribed compute device 132 or 134, prior to the occurrence of the resource-intensive event.

Figure 4:
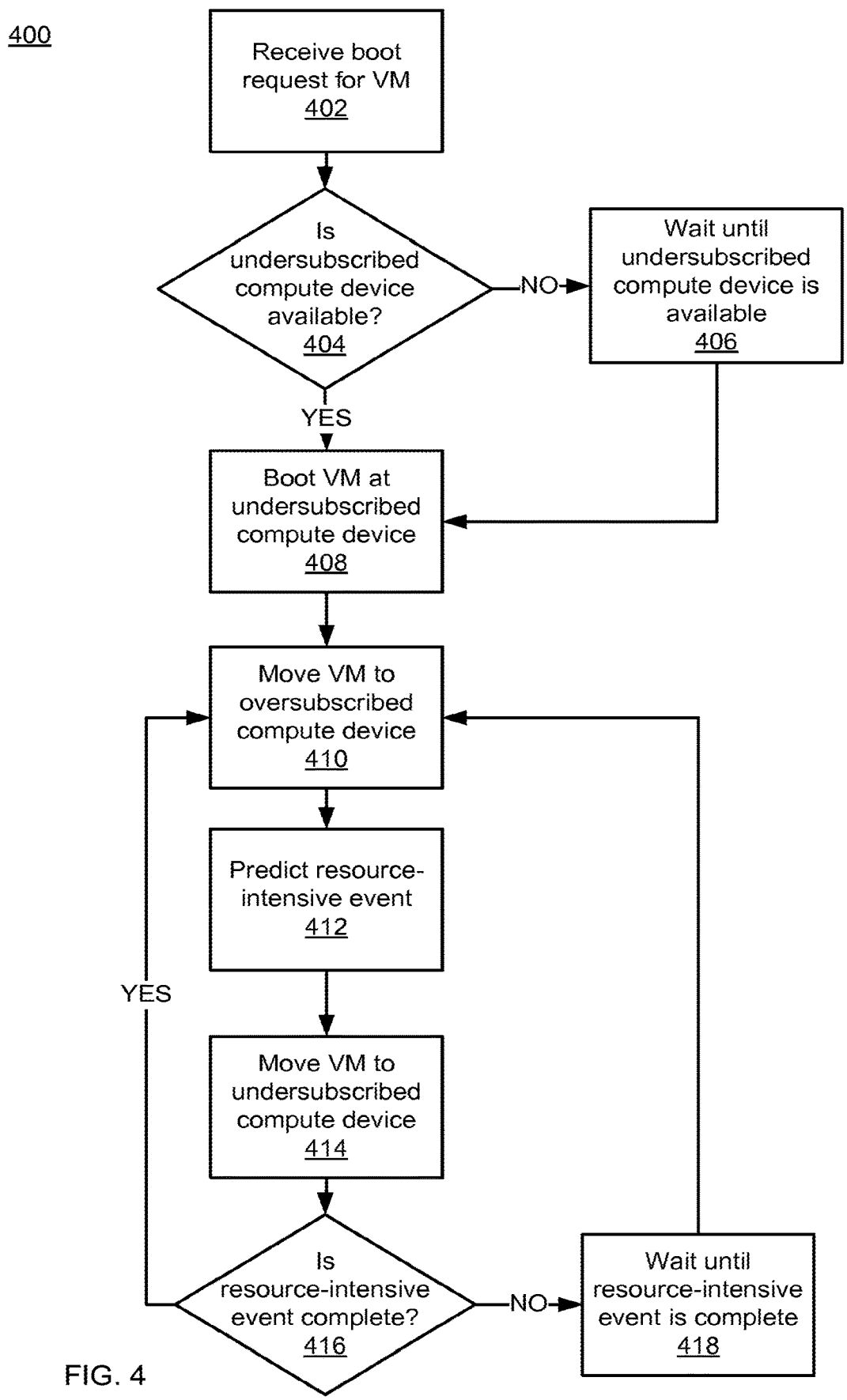
FIG. 4 is a flow chart illustrating a method of booting a virtual machine in an undersubscribed compute device, and migrating the virtual machine between an undersubscribed compute device and an oversubscribed compute device based on prediction of resource-intensive events, according to an embodiment.

FIG. 4 is a flow chart illustrating a method of booting a virtual machine in an undersubscribed compute device, and migrating the virtual machine between an undersubscribed compute device and an oversubscribed compute device based on the prediction of resource-intensive events, according to an embodiment. FIG. 4 is discussed in reference to the migration system 100 for convenience, but can be based within other migration systems. The method 400 includes receiving a request to boot a new virtual machine, at 402. This request can be received, for example, by an orchestration module on a management device. As discussed above, the management device can be, for example, a web server, an application server, a proxy server, a telnet server, a file transfer protocol (FTP) server, or a personal computing device such as a desktop computer, a laptop computer, and/or the like. Also as discussed above, the orchestration module can be a hardware module and/or software module (stored in memory and/or executed in the processor of the management device) that can be operatively coupled to a group of undersubscribed compute devices and a group of oversubscribed compute device, via a network 120.

The method 400 includes determining whether an undersubscribed compute device is available to run the requested virtual machine, at 404. This determination can be performed at, for example, the orchestration module. The orchestration module can, in some instances, regularly or repeatedly poll the virtual machines on the compute devices to infer the work load status associated with each virtual machine and/or compute device. In other instances, the virtual machines can regularly or repeatedly send to the orchestration module signals associated with the work load being executed on the virtual machines and/or compute devices. In yet other instances, the orchestration module can contain a database containing information regarding the work load associated with each compute device. Such information can be updated in real-time, in substantially real-time, periodically or repeatedly. In such instances, the orchestration module can access information in the database corresponding to a compute device that is undersubscribed to determine when that compute device is available to run the requested new virtual machine.

In some instances, no undersubscribed compute devices may be available to run or host the requested virtual machine. In such instances, the orchestration module will wait until an undersubscribed compute device becomes available (e.g., as indicated by the updated status information), as indicated in 406, before sending a signal to boot the requested virtual machine on the newly-available compute device, as in 408. While in the wait period, the orchestration module can continuously, periodically or repeatedly poll the compute devices to identify an available compute device to host or run the requested virtual machine.

In other instances, the wait can be adaptive based on a priority of the virtual machine. For example, if a high priority virtual machine needs to be migrated to an undersubscribed compute device (or an oversubscribed compute device) and no undersubscribed compute device (or oversubscribed compute device) is available, a low priority virtual machine on an undersubscribed compute device (or on an oversubscribed compute device), can be suspended. This can make the physical resources including, CPU, RAM, network bandwidth, etc. available to the high priority virtual machine such that the higher priority virtual machine can be instantiated at and/or migrated to the undersubscribed compute device.

In some other instances, an undersubscribed compute device may be available to run or host the requested virtual machine without a wait period, as in 408. In such instances, the requested virtual machine can be booted (or instantiated) at the available undersubscribed compute device by, for example, a signal sent by the orchestration module to the compute device that is associated with the booting procedures and/or routines. The signal can include, for example, information associated with the type of the virtual machine (e.g. an operating system, an application, a script, etc.), the expected duration of the virtual machine's life cycle, the number of virtual machines to be provisioned for the virtual machine, when the workload on the virtual machine is expected to be high, and/or the like.

Once the booting process for the virtual machine is completed, and the virtual machine is instantiated on the undersubscribed compute device, the virtual machine can be migrated or moved to an oversubscribed compute device, at 410. This can occur when or after a signal acknowledging the instantiation of the virtual machine is sent, for example, by the undersubscribed compute device to the orchestration module. In response to the acknowledgement signal, a second signal can be sent by the orchestration module to that compute device. Such instantiation on an undersubscribed compute device and then migration to an oversubscribed compute device is desirable because the booting process associated with a virtual machine can be the most Physical resource intensive period in a virtual machine's life cycle. For example, a virtual machine can consume 100% (or close to 100%) of the cycles of a physical CPU core on the compute device that is hosting the virtual machine during this period. Once in the "booted" state however, the virtual machine can generally settle into a steady state consuming less physical CPU cycles, and thus can be migrated to an oversubscribed compute device without affecting the performance of any of the virtual machines already running on the oversubscribed compute device. As a consequence, the undersubscribed compute device can be available to act as a "birthing station" to boot a second virtual machine at a subsequent time.

At 412, prediction of resource-intensive events (e.g., upgrading a virtual machine, making a backup of a virtual machine at a specified time, and/or the like) on the virtual machine can be performed by, for example, the prediction module on the management device. Such a prediction can be performed by having the oversubscribed compute device running (or hosting) the virtual machine send to the prediction module continuous, periodic or repeated signals associated with the status of the virtual machine. The prediction module can use these status signals and statistical predictive algorithms to predict the high probability of occurrence of a resource-intensive event on a virtual machine prior to its manifestation.

Once the prediction of a resource-intensive event is made, the virtual machine can be migrated or moved to an undersubscribed compute device, at 414. Such migration can be done by the prediction module sending a signal to the orchestration module that can allow the orchestration module to commence the process of migrating the appropriate virtual machine from the oversubscribed compute device to an undersubscribed compute device, prior to the commencement of the resource-intensive event. The migration occurs because during the resource-intensive event, the virtual machine will typically consume more physical resources than during steady state, which can adversely affect the performance of other virtual machines running on the specific oversubscribed compute device. Hence, migration of the virtual machine to an undersubscribed compute device prior to the manifestation of the resource-intensive event can allow the recourse-intensive event to execute more smoothly on the virtual machine. The migration can also prevent adversely affecting the performance of the other virtual machines that were being hosted by the oversubscribed compute device. In some instances, if a higher priority virtual machine needs to be migrated to an undersubscribed compute device and no undersubscribed compute device is available, then a lower priority virtual machine on the destination compute device, can be suspended. This can make the physical resources including, CPU, RAM, network bandwidth, etc. available to the high priority virtual machine such that the higher priority virtual machine can be instantiated at and/or migrated to the destination compute device.

At 416, continuous, periodic or repeated polling and/or analysis is performed to determine whether the resource-intensive event is complete. In some instances, this determination can be done by the orchestration module polling the virtual machines on a regular basis to determine the status of the work-load associated with the virtual machines. In other instances, the virtual machine can be configured to send periodic status signals to the orchestration module. If the resource-intensive event is determined to be complete, the virtual machine can be moved back to an oversubscribed compute device, at 410. If the resource-intensive event is not found to be complete, the orchestration module will wait until the resource-intensive event is complete, as indicated in 418, before moving the virtual machine to an oversubscribed compute device, at 410.

Figure 5:
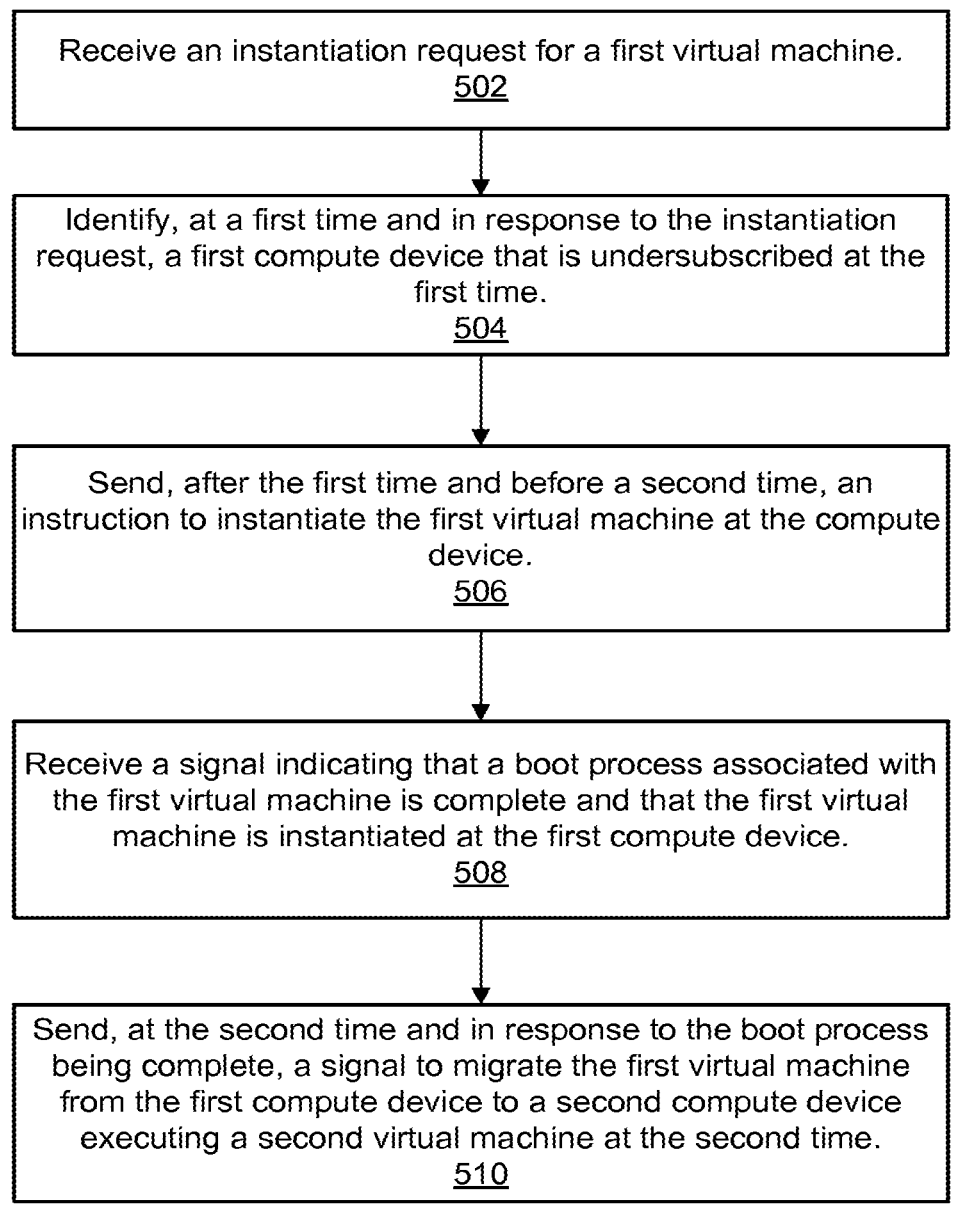
FIG. 5 is a flow chart illustrating a method of instantiating a virtual machine in an undersubscribed compute device and migrating the virtual machine to an oversubscribed compute device after boot-up, according to an embodiment.

FIG. 5 is a flow chart illustrating a method of instantiating a virtual machine on an undersubscribed compute device and migrating the virtual machine to an oversubscribed compute device after boot-up, according to an embodiment. The method 500 includes receiving an instantiation request for a first virtual machine, at 502. The request can originate from, for example, a network administrator, a network analyst, a network engineer and/or the like, and can be received at, for example, an orchestration module of a management device.

In response to the request for the instantiation of a first virtual machine, a first compute device is identified at a first time that is undersubscribed. An undersubscribed compute device can denote a compute device which is either not executing a virtual machine at the first time and/or has enough physical resources (such as CPU, RAM, hard disk, network bandwidth etc.) available to accommodate the maximum computing needs of the requested virtual machine. The identification of an undersubscribed compute device can be performed by, for example, the orchestration module as discussed above.

After successful identification of an undersubscribed compute device, an instruction can be sent after the first time and before the second time to instantiate the first virtual machine at the undersubscribed compute device by, for example, the orchestration module, at 506. As discussed above, the signal can contain information associated with the type of the first virtual machine (e.g. an operating system, an application, a script, etc.), the expected duration of the virtual machine's life cycle, the number of virtual machines to be provisioned for the virtual machine, when the workload on the virtual machine is expected to be high, and/or the like.

A signal can be received by for example, an orchestration module, that can indicate the completion of the boot process associated with the first virtual machine and that the first virtual machine is instantiated at the first undersubscribed compute device, at 508. This signal sent by the undersubscribed compute device can indicate to the orchestration module that the boot process is over, and the first virtual machine can settle into a steady state where it can consume less physical CPU cycles, In response to the boot process of the first virtual machine being complete, a signal can be sent at a second time to migrate the first virtual machine from the first (undersubscribed) compute device to a second (oversubscribed) compute device that is executing a second virtual machine at the second time, at 510. This signal can be sent by for example, the orchestration module to the first (undersubscribed) compute device and can allow the migration of the first virtual machine to the second (oversubscribed) compute device without affecting the performance of any of the other already running virtual machines on the first (undersubscribed) or second (oversubscribed) compute device. This can free the first (undersubscribed) compute to act as a "birthing station" to boot a second virtual machine at a subsequent time.

In some embodiments, an enterprise network system can have more than a single group of undersubscribed compute devices and more than a single group of oversubscribed compute devices. In such embodiments, for example, a virtual machine can be instantiated in a first group of undersubscribed compute devices, migrated to a group of oversubscribed devices, and on the prediction of a resource-intensive event can migrate back to a second group of undersubscribed compute devices, where the second group of undersubscribed devices is different from the first group of undersubscribed devices.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools.

Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
   receiving an instantiation request for a virtual machine and associated with rebooting the virtual machine;
   determining whether a first compute device is available as an undersubscribed compute device to reboot the virtual machine;
   sending an instruction to instantiate the virtual machine at the first compute device in response to determining the first compute device is available as the undersubscribed compute device, the first compute device being in an undersubscribed configuration causing a number of all virtual machines provisioned at the first compute device to be no greater than a total number of central processing units at the first compute device; and
   sending a signal to migrate the virtual machine from the first compute device to a second compute device, in response to an indication of a completion of a boot process associated with the virtual machine at the first compute device, the second compute device being in an oversubscribed configuration causing a number of all virtual machines provisioned at the second compute device to be greater than a total number of central processing units at the second compute device.

2. The method of claim 1, wherein:
   the virtual machine is a first virtual machine, the second compute device is configured to execute the first virtual machine and a second virtual machine after the migration.

3. The method of claim 1, further comprising:
   receiving the instantiation request at the second compute device.

4. The method of claim 1, wherein the first compute device and the second compute device are within a data center.

5. The method of claim 1, wherein the signal is a first signal, the method further comprising:
   receiving a second signal associated with a status of the virtual machine at the second compute device;
   determining, based on the status, a characteristic of a resource-intensive event at the second compute device; and
   sending, based on the characteristic of the resource-intensive event, a third signal to migrate the virtual machine from the second compute device to a third compute device, the third compute device implementing the undersubscribed configuration.

6. The method of claim 1, wherein the signal is a first signal, the method further comprising:
   predicting, based on a status of the virtual machine at the second compute device, a characteristic of a resource-intensive event at the second compute device, the resource-intensive event including at least one of updating the virtual machine and making a backup copy of the virtual machine, the characteristic including a specified time associated with the resource-intensive event; and
   sending, based on the characteristic of the resource-intensive event, a second signal to migrate the virtual machine from the second compute device to a third compute device, the third compute device implementing the undersubscribed configuration.

7. A method, comprising:
   receiving, at a first time, a first signal associated with a status of a virtual machine at a first compute device, the first compute device implementing an oversubscribed policy;
   determining, based on the first signal, a likelihood of a resource-intensive event associated with the virtual machine;
   determining whether a second compute device is available as an undersubscribed compute device to reboot the virtual machine;
   sending, at a second time after the first time and in response to determining the second compute device is available as the undersubscribed compute device, a second signal, prior to the resource-intensive event, to migrate the virtual machine from the first compute device to the second compute device that implements an undersubscribed policy, and to reboot the virtual machine; and
   sending, at a third time after the second time, a third signal, in response to an indication of a completion of the resource-intensive event, to migrate the virtual machine from the second compute device to a third compute device that implements the oversubscribed policy.

8. The method of claim 7, wherein the third compute device is the first compute device.

9. The method of claim 7, further comprising:
   receiving, at a fourth time prior to the first time, an instantiation request for the first virtual machine;
   sending an instruction to instantiate the virtual machine at a fourth compute device, the fourth compute device implementing the undersubscribed policy; and
   sending, at a fifth time after the fourth time and prior to the first time, a fourth signal to migrate the virtual machine from the fourth compute device to the first compute device, in response to an indication of a completion of a boot process associated with the virtual machine at the fourth compute device.

10. The method of claim 7, wherein the first compute device, the second compute device, and the third compute device are within a data center.

11. The method of claim 7, wherein the status of the virtual machine at the first compute device is associated with work load of the virtual machine at the first compute device.

12. The method of claim 7, further comprising:
    receiving the first signal associated with the status of the virtual machine at the first compute device in real-time.

13. An apparatus, comprising:
    a memory; and
    a processor operatively coupled to the memory, the processor configured to:
       receive, at a first time, a first signal associated with a status of a virtual machine at a first compute device, the first compute device implementing an oversubscribed policy;
       determine, based on the first signal, a likelihood of a resource-intensive event associated with the virtual machine;

determine whether a second compute device is available as an undersubscribed compute device to reboot the virtual machine;

send, at a second time after the first time and in response to determining the second compute device is available as the undersubscribed compute device, a second signal, prior to the resource-intensive event, to migrate the virtual machine from the first compute device to the second compute device that implements an undersubscribed policy, and to reboot the virtual machine; and send, at a third time after the second time, a third signal, in response to an indication of a completion of the resource-intensive event, to migrate the virtual machine from the second compute device to a third compute device that implements the oversubscribed policy.

14. The apparatus of claim 13, wherein the third compute device is the first compute device.

15. The apparatus of claim 13, wherein the processor is configured to:

receive, at a fourth time prior to the first time, an instantiation request for the virtual machine;

send an instruction to instantiate the virtual machine at a fourth compute device, the fourth compute device implementing the undersubscribed policy; and send, at a fifth time after the fourth time and prior to the first time, a fourth signal to migrate the virtual machine from the fourth compute device to the first compute device, in response to an indication of a completion of a boot process associated with the virtual machine at the fourth compute device.

16. The apparatus of claim 13, wherein the first compute device, the second compute device, and the third compute device are within a data center.

17. The apparatus of claim 13, wherein the status of the virtual machine at the first compute device is associated with work load of the virtual machine at the first compute device.

18. The apparatus of claim 13, wherein the processor is configured to:

receive the first signal associated with the status of the virtual machine at the first compute device in real-time.

* * * * *